US012666265B2

(12) United States Patent
    G

(10) Patent No.:  US 12,666,265 B2
(45) Date of Patent:      Jun. 23, 2026

(54) USER APPROVAL OPTIONS TO ALLOW OR REJECT NEAR-FIELD ACCESS FOR TECHNICIAN TO CONNECT TO THE SYSTEM

(71) Applicant: Trane International Inc., Davidson, NC (US)

(72) Inventor: Praveen Kumar G, Chennai (IN)

(73) Assignee: TRANE INTERNATIONAL INC., Davidson, NC (US)

( * ) Notice: Subject to any disclaimer, the term of this patent is extended or adjusted under 35 U.S.C. 154(b) by 291 days.

(21) Appl. No.: 18/621,844

(22) Filed: Mar. 29, 2024

(65) Prior Publication Data

US 2025/0310768 A1      Oct. 2, 2025

(51) Int. Cl.
    H04W 12/08      (2021.01)
    H04W 4/80      (2018.01)
    H04W 76/14      (2018.01)
(52) U.S. Cl.
    CPC ............. H04W 12/08 (2013.01); H04W 4/80 (2018.02); H04W 76/14 (2018.02)
(58) Field of Classification Search
    CPC ........ H04W 12/08; H04W 4/80; H04W 76/14
    See application file for complete search history.

(56) References Cited

U.S. PATENT DOCUMENTS

| | | | |
|---|---|---|---|
| 7,149,936 B2 | 12/2006 | Deshpande et al. | |
| 9,257,020 B2 | 2/2016 | Bender et al. | |
| 9,467,738 B2 | 10/2016 | Gonzalez | |
| 9,714,771 B1 | 7/2017 | Goodman et al. | |
| 10,430,175 B2 | 10/2019 | Atchison et al. | |
| 10,749,912 B2 | 8/2020 | Hu et al. | |
| 11,579,601 B2 | 2/2023 | Lamont et al. | |
| 11,768,924 B2 | 9/2023 | Dogra et al. | |
| 2018/0262891 A1* | 9/2018 | Wu ...................... H04W 12/065 |
| 2019/0289466 A1* | 9/2019 | Conant ................. H04W 12/06 |
| 2020/0064002 A1* | 2/2020 | Bogli .................. H04L 63/0876 |
| 2020/0380098 A1* | 12/2020 | Dogra ..................... G06F 21/31 |

* cited by examiner

*Primary Examiner* — Zhitong Chen
(74) *Attorney, Agent, or Firm* — Womble Bond Dickinson (US) LLP

(57)      ABSTRACT

A method and system allow a near-field wireless connection between a climate control system and a service edge device to be established for servicing the climate control system. A request to establish the near-field wireless connection is sent from the service edge device to a server or other processor associated with the climate control system. The server may verify the service edge device is permitted to connect to the climate control system. The server requests, to an owner edge device, authorization to allow the near-field wireless connection. The server receives authorization from the owner edge device to allow the near-field wireless connection. The server sends instruction to the climate control system to allow the near-field wireless connection.

20 Claims, 7 Drawing Sheets

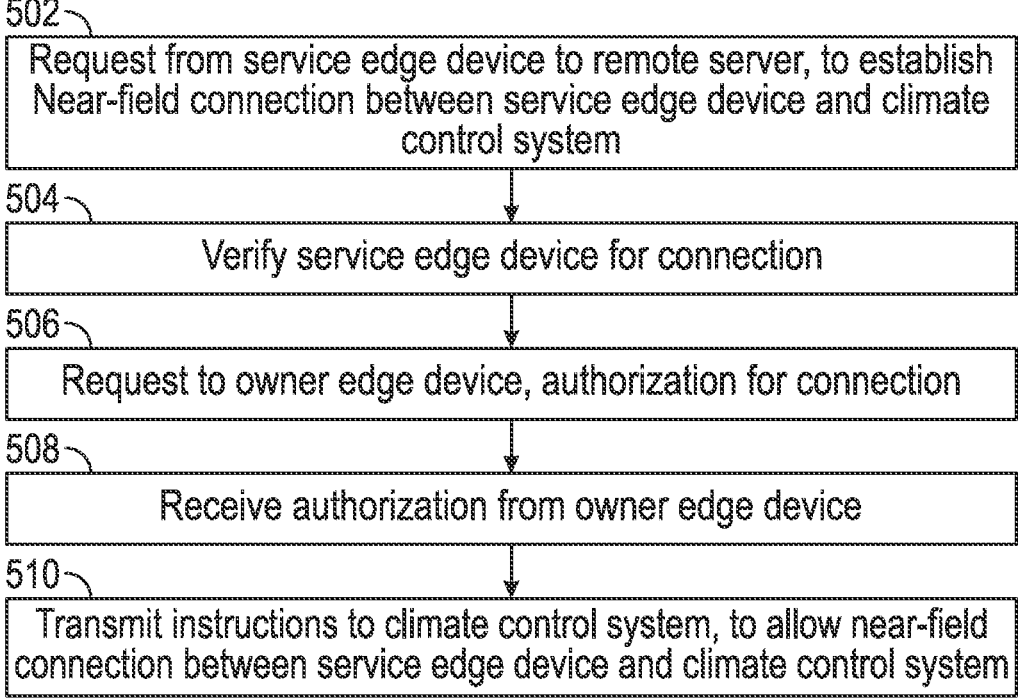

502 — Request from service edge device to remote server, to establish Near-field connection between service edge device and climate control system 504 — Verify service edge device for connection 506 — Request to owner edge device, authorization for connection 508 — Receive authorization from owner edge device 510 — Transmit instructions to climate control system, to allow near-field connection between service edge device and climate control system

FIG. 5A

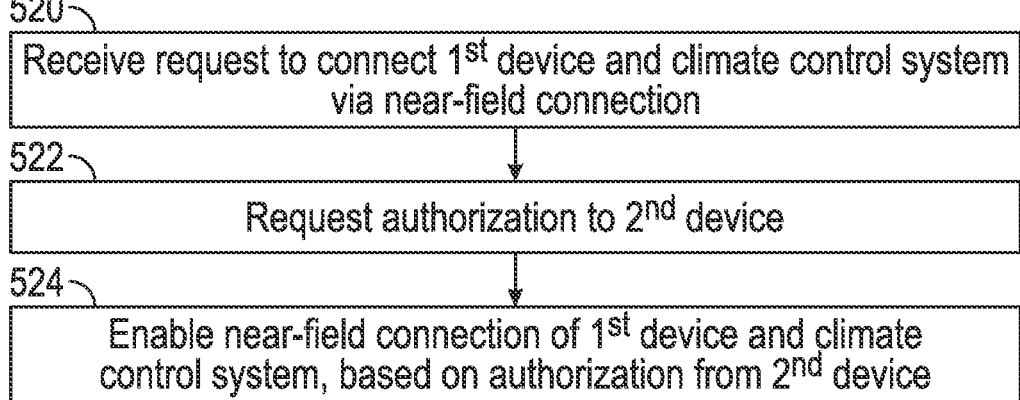

520 — Receive request to connect 1st device and climate control system via near-field connection 522 — Request authorization to 2nd device 524 — Enable near-field connection of 1st device and climate control system, based on authorization from 2nd device

FIG. 5B

530
| Receive request from 1st device to establish near-fied connection between 1st device and climate control system |

532
| Request, to 2nd device, authorization |

534
| Receive authorization from 2nd device |

536
| Establish near-field connection between 1st device and climate control system |

USER APPROVAL OPTIONS TO ALLOW OR REJECT NEAR-FIELD ACCESS FOR TECHNICIAN TO CONNECT TO THE SYSTEM

TECHNICAL FIELD

The present disclosure relates generally to diagnostics, prognostics, human and machine interfaces, climate control systems, controls and thermostats, communications protocols, and more specifically to authorization or enablement of near-field communication with a climate control system.

BACKGROUND

Diagnostics and prognostics with systems are broadly practiced throughout a variety of technologies, some general, some specific to a technology or even to a machine. Remote access to systems may be broadly practiced with a variety of devices, communications links, communications protocols, systems and extended systems, etc. Security concerns for remote access, and for connections for diagnostics and prognostics, may be addressed through a general variety of security precautions, security protocols, etc. Yet, the above may not be optimal, and may impose various levels of inconvenience or even exposure for malice, to owners of systems, users of systems, service providers for systems, and service personnel. There is an ongoing need for technological improvements in the above areas, generally and/or for specific technologies or specific systems, and it is in this environment that present embodiments arise.

SUMMARY

The present disclosure includes, without limitation, the following examples.

One embodiment is a method of allowing a near-field wireless connection between a climate control system and a service edge device to be established for servicing the climate control system. The method includes receiving a request to establish the near-field wireless connection between the climate control system and the service edge device, the request sent from the service edge device to a processor associated with the climate control system, the processor located a distance from the climate control system. The method includes verifying the service edge device is permitted to connect to the climate control system via the near-field wireless connection. The method includes requesting authorization to allow the near-field wireless connection to be established based on the request, the requested authorization sent to an owner edge device, the owner edge device configured to adjust at least one setting of the climate control system unrelated to the near-field wireless connection. The method includes receiving the authorization from the owner edge device to allow the near-field wireless connection to be established. The method includes transmitting instructions to allow the near-field wireless connection to be established. Allowing the near-field wireless connection to be established includes sending a signal to the service edge device to display an indication the near-field wireless connection is allowed or established.

One embodiment is a climate control system. The climate control system includes a heat pump system, a system controller coupled to the heat pump system, and a near-field wireless communication transceiver coupled to the system controller. The system controller is to receive an instruction from a server to allow a near-field wireless connection to be established between a service edge device and the near-field wireless communication transceiver, enabling the service edge device to communicate with the system controller and the heat pump system via the near-field wireless connection. The instruction is based on the service edge device requesting to establish the near-field wireless connection, the server verifying the service edge device is permitted to connect to the climate control system via the near-field wireless connection, the server requesting to an owner edge device authorization to allow the near-field wireless connection to be established, and the server receiving authorization from the owner edge device to allow the near-field wireless connection to be established. The system controller is to direct the near-field wireless communication transceiver to establish the near-field wireless connection between the service edge device and the near-field wireless communication transceiver, based on receiving the instruction from the server to allow the near-field wireless connection to be established.

One embodiment is a server having an app. The server having an app is to to receive a request from the service edge device to establish the near-field wireless connection between the service edge device and the near-field wireless communication transceiver of the climate control system. The server having an app is to verify the service edge device is permitted to connect to the climate control system via the near-field wireless connection. The server having an app is to request, to the owner edge device, authorization to allow the near-field wireless connection to be established. The server having an app is to receive, from the owner edge device, the authorization to allow the near-field wireless connection to be established. The server having an app is to send the instruction to the system controller to allow the near-field wireless connection to be established between the service edge device and the near-field wireless communication transceiver.

One embodiment is a user device, which may be a service edge device, having an app. The user device having an app is to send, to a server, a request to establish a near-field wireless connection between the service edge device and a near-field wireless communication transceiver of a climate control system. The user device having an app is to communicate with the system controller and the heat pump system via the authorized and established near-field wireless connection.

One embodiment is a user device, which may be an owner edge device, having an app. The user device having an app is to receive, from a server, a request for authorization to allow the near-field wireless connection to be established between the service edge device and the near-field wireless communication transceiver of the climate control system. The user device having an app is to send, to the server, the authorization to allow the near-field wireless connection to be established. The user device having an app may further communicate with the climate control system, to control at least one function of the climate control system.

These and other features, aspects, and advantages of the disclosure will be apparent from a reading of the following detailed description together with the accompanying drawings, which are briefly described below. The disclosure includes any combination of two, three, four, or more of the above-noted embodiments, examples, or implementations as well as combinations of any two, three, four, or more features or elements set forth in this disclosure, regardless of whether such features or elements are expressly combined in a specific example description herein. This disclosure is intended to be read holistically such that any separable features or elements of the disclosed disclosure, in any of its various aspects, embodiments, examples, or implementations, should be viewed as intended to be combinable unless the context clearly dictates otherwise.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5A is a flow diagram, illustrating an embodiment of a method of allowing a near-field wireless connection between a climate control system and a service edge device to be established for servicing the climate control system.

FIG. 5B is a flow diagram, illustrating an embodiment of a method of enabling a near-field wireless connection between a user device and a climate control system to be established for servicing the climate control system.

DETAILED DESCRIPTION

Figure 1:
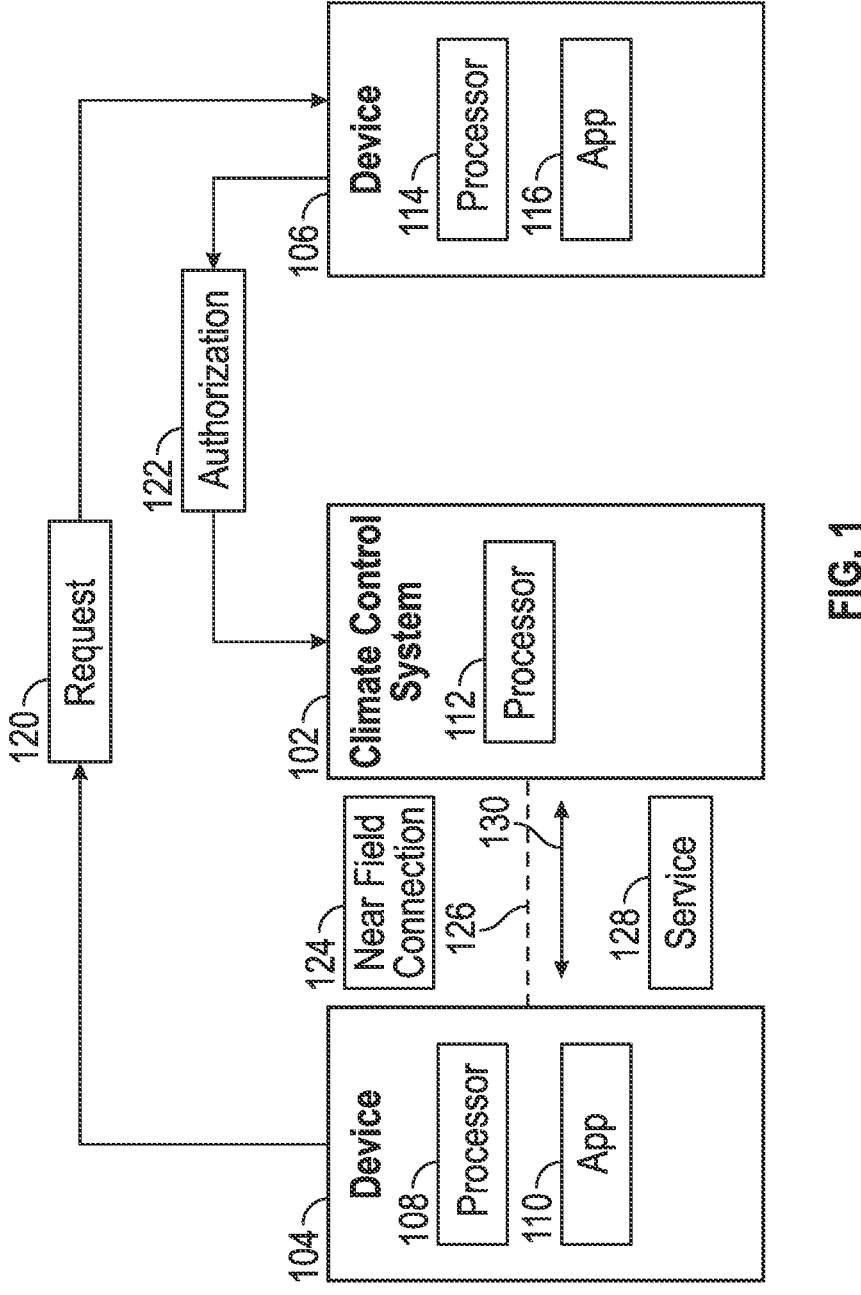
FIG. 1 illustrates an embodiment of a system with near-field connectivity (e.g., Bluetooth), which may be authorized and enabled so that a technician can operate a user device to connect with a climate control system for service.

Various embodiments of a controller or system with near-field connectivity that can be enabled through user authorization are described herein. Some embodiments are specific to a climate control system, and support access to the climate control system for service from a mobile device, e.g., operated by a technician, through authorized near-field connection of the mobile device and the climate control system. Authorization may be requested to, and confirmed from, a further mobile device, e.g., operated by an owner or user of the climate control system. There are multiple ways in which such authorization and such near-field connection may be arranged or accomplished, and various embodiments directed to respective technologies and technological features, which may be technological improvements, are presented herein.

Some embodiments have a processor and communication-equipped system with a near-field connectivity that may be a Bluetooth option, to connect with a mobile application to debug an HVAC (heating, ventilation and air conditioning) or climate control system. For example, an HVAC system could be coupled to a smart control, e.g., a smart thermostat, indoor controller, outdoor controller, indoor and/or outdoor climate control unit such as a system controller, integrated controller, accessory controller, etc., which includes or is part of such a processor and communication-equipped system. In some embodiments, a technician can connect with the system (e.g., through a user device operated by the technician) only if a user or customer (e.g., owner or user of the HVAC system) turns on the near-field connectivity (e.g., Bluetooth connectivity, near-field transceiver(s), near-field wireless module(s), etc.) through an app on the user device operated by the user or customer. In some embodiments, allowing the near-field wireless connection to be established includes allowing the wireless connection to be established for a limited period of time, which may be based on an identified service issue. In some embodiments, establishing the near-field wireless connection includes permitting or limiting a set of commands via the near-field wireless connection.

In one operating scenario and various embodiments, a technician arrives outside a home or building that has an HVAC system with a smart control having near-field connectivity. The technician wants to connect with the system, e.g., for diagnostics or service. For example, the technician has a user device, such as a mobile device with an application, e.g., an "app", that is specific to such systems and connectivity for diagnostics or service. Ordinarily, without the benefit of present embodiments, a user might have to be present inside the home or building and turn on (e.g., enable through a user interface) a connectivity option (e.g., enable near-field or Bluetooth connection), or perhaps provide the service technician with a password or other security information, so that the technician can use the user device to connect with the HVAC system with smart control, and access the HVAC system for service or diagnostics. In other instances, the user has to allow the service technician into the house to enable the connectivity option. Regardless, this existing process(es) poses an inconvenience to the user, who would have to be home for such service, and/or would pose a security risk, e.g., due to escape of security information or inconvenience of need to re-do security information to prevent future malicious access.

Instead of such inconvenience or security risk, present embodiments offer technological improvement in various areas which may include user interfaces, communications sequences, security technology, systems technology, near-field communication technology, smart control technology, mobile device and apps technology, and/or HVAC system technology. Continuing in one operating scenario, the technician may send a near-field connection request (e.g., a request for Bluetooth connection) from an app on the user device of the technician, and such a near-field connection request may be received by a user device of a user or customer. In this scenario, the visiting technician is trying to connect their user device to the HVAC system with the smart control, through near-field connection (e.g., Bluetooth), so that the technician can service the HVAC system from outside of the home or building. The user or customer, upon receiving the near-field connection request on their user device, may accept the request, so that the technician has no need to walk inside the house or building. Upon user or customer accepting the request for near-field connection, the system then enables the near-field connection of the user device of the technician and system, so that the technician can perform service or diagnostics, for example debugging an HVAC system or obtaining diagnostic information from the HVAC system, from outside the house or building. This may be accomplished by the user or customer accepting the request, e.g., pressing a hot button on a user interface on an app on the user device, which user device then sends authorization for the near-field connection to the HVAC system with smart control. And, the HVAC system with smart control then enables near-field connection for the technician, e.g., near-field connection of user device of technician and HVAC system with smart control, according to such authorization.

Features for some embodiments may include various combinations of the following.

A system may have a Bluetooth option to connect with a mobile application to debug an HVAC system.

A technician may connect with a system only if a user or customer turns on a Bluetooth button (or other near-field communication authorization selection) on a specialized app on a user device of the user or customer.

Once a technician reaches a customer home, the technician may give a Bluetooth ON request (or other near-field communication authorization request) from a specialized app on a user device of the technician.

A Bluetooth ON request (or other near-field communication authorization request) may be displayed on a thermostat or other smart control, e.g., a home screen on the system in the home or building, and also (or similarly) may be displayed on a specialized app on a user device of the user or customer.

The user or customer may approve/allow or reject/cancel the Bluetooth ON request (or other near-field communication authorization request), e.g., through the home screen on the system in the home or building, or through the specialized app on the user device of the user or customer.

If the user or customer approves or allows, then the Bluetooth or other near-field connection and communication is turned on (e.g., enabled, authorized, allowed), and the technician can access the system.

If the user or customer gives the reject/cancel command, i.e., does not authorize or disallows the Bluetooth or other near-field connection and communication, then the technician cannot access the system.

On a smart thermostat or other smart control, the system may display various information, which could include username, technician company name, pin code, date, etc.

Variations on the above scenarios and embodiments are readily devised in keeping with the teachings herein, as further described below. For example, some embodiments may use specialized apps on user devices, some embodiments may use cloud services and equipment, some embodiments use various user devices, and development of specific embodiments may use knowledge of those skilled in the art combined with the teachings herein.

FIG. 1 illustrates an embodiment of a system with near-field connectivity 126 (e.g., Bluetooth), which may be authorized and enabled so that a technician can operate a user device 104 to connect with a climate control system 102 for service. In one applicable operating scenario, a technician has a user device 104, equipped with a processor 108 and an app 110, and the technician with user device 104 arrives to service or diagnose the climate control system 102. If the user, owner, operator, customer, etc. of the climate control system 102 is at home or is in a building in which the climate control system 102 operates, the user or customer may assist the technician in connecting the user device 104 of the technician with the climate control system 102 through a near-field connection, so that the technician can use the user device 104 and the app 110 to access the climate control system 102 for diagnostics, service, etc. For example, it may be in such circumstances that the user gives the technician a Wi-Fi password, or enables near-field connectivity 126 from the climate control system 102, e.g., through pressing a WPS (wireless provisioning service) button or use of a touchscreen of the climate control system 102 (not shown in FIG. 1).

However, the user or customer may not be home or in the building, or may not wish to give away a password and risk future exposure to unauthorized access, nor have to reconfigure a password with all the inconvenience that entails. In one operating scenario applicable to some embodiments, the user or customer has a user device 106 with a processor 114 and an app 116, and may participate in remote authorization of the near-field connection 124 through near-field connectivity 126 of the technician's user device 104 and the climate control system 102, as follows (and in further embodiments below).

Using an app 110 that is specialized, e.g. for a specific product, manufacturer, type of system, etc., and installed on the user device 104, the technician sends a request 120 for authorization of near-field connection 124, to connect the user device 104 and the climate control system 102. The request 120 is sent to the user device 106, used by the user or customer who may be away from home or the building that has the climate control system 102. A specialized app 116 on the user device 106 receives the request 120, and indicates the request 120 for authorization of near-field connection 124 may be accepted or denied. For example, the app 116 could display suitable information (e.g., announcement of request for authorization of near-field connection) on a screen of the user device 106, with soft selection buttons (e.g., touchscreen symbols) for accepting or denial of authorization of near-field connection 124. Upon the user selecting to accept the request for authorization of near-field connection, e.g., user selecting to authorize, enable or allow the near-field connection 124 through near-field connectivity 126, the app 116 on the device 106 sends the authorization 122, to the climate control system 102. For example, the request 120 and the authorization 122 could be in the form of messages, or other data, transmitted and received over a network, which could be a cellular network or the global connectivity network known as the Internet. Upon receiving the authorization 122, the climate control system 102 uses the processor 112 to enable the near-field connection 124 through near-field connectivity 126, and thus connects the user device 104 of the technician and the climate control system 102 through the authorized near-field connection 124. With the user device 104 of the technician so-connected with the climate control system 102, the technician can operate the user device 104 to transmit or receive technical information regarding the climate control system, which may be arranged through the app 110 on the user device 104. Technical information could include diagnostics, software corrections, updates, settings, instructions, etc. If, on the other hand, the user, owner or customer selects to deny authorization of near-field connection 124, this may or may not be transmitted to the climate control system 102, but in either case, the climate control system 102 does not enable the near-field connection 124 through the near-field connectivity 126, and the technician (or other person or machine) would then be unable to use the user device 104 to access the climate control system 102.

Figure 2:
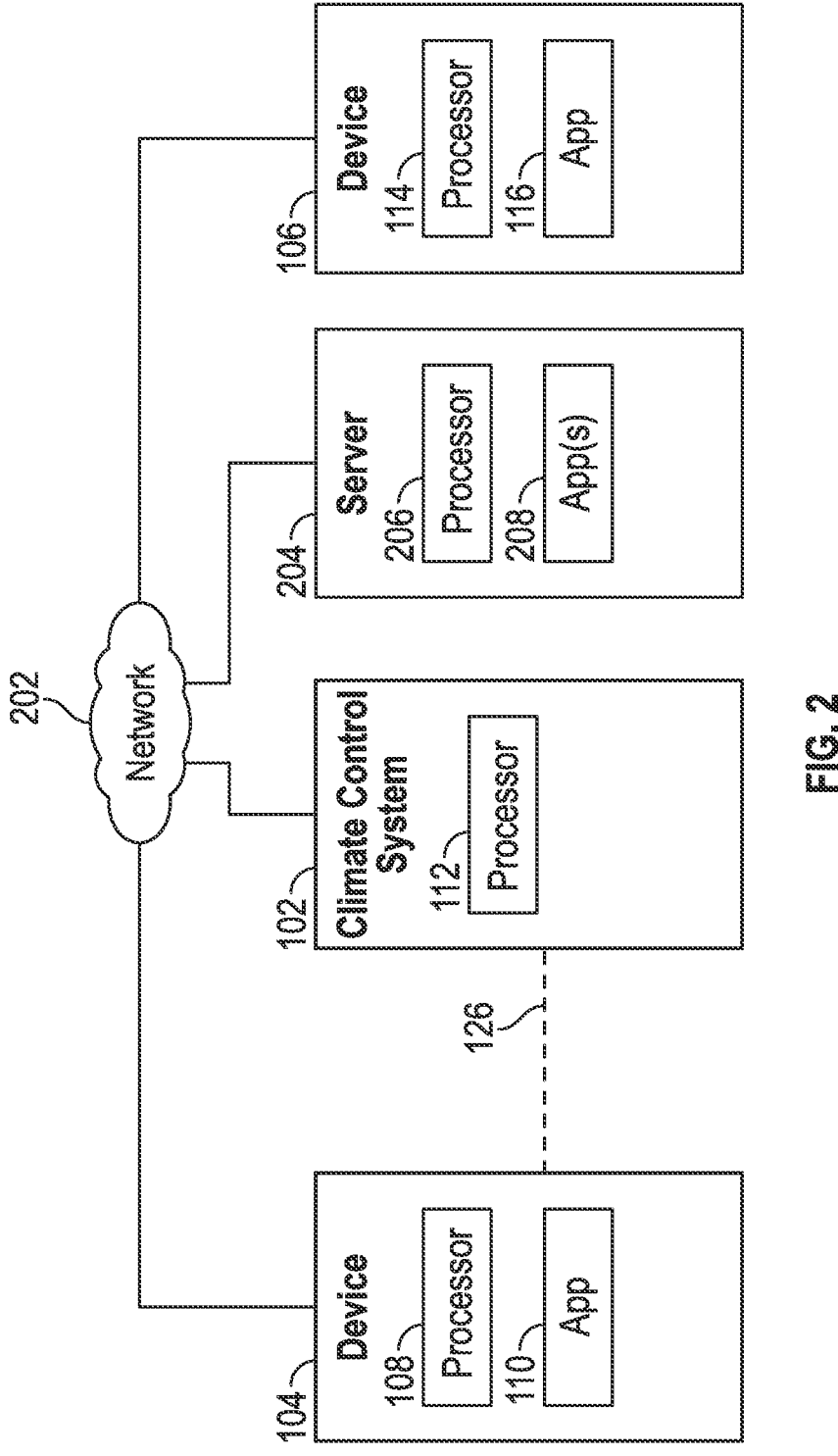
FIG. 2 illustrates an embodiment of the system with near-field connectivity (e.g., Bluetooth) and network connectivity (e.g., LAN, WAN, Internet, cloud), in which the near-field connectivity may be authorized and enabled through the cloud connectivity, so that a technician can operate a user device to connect with a climate control system for service.

FIG. 2 illustrates an embodiment of the system with near-field connectivity 126 (e.g., Bluetooth) and network connectivity (e.g., LAN or local area network connectivity, WAN or wide area network or wireless area network connectivity, Internet or global network connectivity, cloud or connectivity to "the cloud"), in which the near-field connectivity 126 may be authorized and enabled through the cloud connectivity, so that a technician can operate a user device 104 to connect with a climate control system 102 for service. Here are further ways, and suitable embodiments, for communicating the request 120, communicating authorization 122 (see FIG. 1), and arranging to enable near-field connectivity 126.

In embodiments depicted in FIG. 2, there is a server 204 with a processor 206 and one or more apps 208, coupled to or in the cloud 202, e.g., a cloud server of an Internet service provider. The app(s) 208 on the server 204 may be specialized, that is dedicated to specific product(s), manufacturer(s), customer(s), etc., for example an app dedicated to installed climate control systems for use by customers, technicians, factory personnel, etc. More specifically, the app(s) 208 on the server 204 may handle requests 120 and authorizations 122 (see FIG. 1) for near-field connection to climate control system 102, and may handle further information or tasks with respect to climate control system 102.

There may be apps 110, 116 on user devices 104, 106, and these may be specialized, e.g. for such requests and authorizations, as above, or may be general to cloud connectivity, e.g., web browsers able to connect through the cloud 202, to the server 204 to use the app(s) 208, e.g., as a website access.

In one scenario, and respective embodiments, the app 110 on the user device 104 of the technician generates a display with a selector (e.g., a soft button or a drop down menu item, on which to click) for sending a request 120 to authorize near-connection 124 through enablement of near-field connectivity 126. This is so the technician can access the climate control system 102 from the user device 104, through near-field connection 124 (e.g., Bluetooth). Upon selecting to send the request 120, the app 110 on the user device 104 sends the request 120 through cloud connectivity and the cloud 202, to the server 204, where the app(s) 208 receive the request 120 and make the request 120 available to the app 116 on the user device 106 of the user or customer. The app 116 on the user device 106 of the user or customer connects the user device 106 through cloud connectivity and the cloud 202, to the server 204, and to the app(s) 208, to observe the request 120 and provide opportunity for the user to respond to the request 120. For example, the app 116 on the user device 106 generates a display with a selector (e.g., a soft button or a drop down menu item, on what to click) for acknowledging or accepting the request 120 and/or authorizing near-field connection 124 through enablement of near-field connectivity 126. The user may acknowledge or accept the request and authorize near-field connection 124. Such action may be communicated as authorization 122 from the app 116 on the user device 106, through the cloud 202, to the server 204 and the app(s) 208. The app(s) 208 on the server 204 then communicates the authorization 122 through the cloud 202, to the climate control system 102, where the processor 112 enables the near-field connectivity

126 and establishes the near-field connection 124 between the user device 104 of the technician and the climate control system 102. From then on, the technician can use the device 104 to communicate via the enabled near-field connectivity 126 and established near-field connection 124, with the climate control system 102, and perform service or diagnostics operations, etc.

In one scenario, and respective embodiments, the app(s) 208 on the server 204 generates a display with a selector (e.g., a soft button or a drop down menu item, on which to click) for sending a request 120 to authorize near-connection 124 through enablement of near-field connectivity 126. The user device 104 with the app 110, which may be a web browser, connects to the server 204 through the cloud 202, e.g., accessing a website, and displays the so-generated display with selector for sending a request 120 to authorize near-field connection 124. This is so the technician can access the climate control system 102 from the user device 104, through near-field connection 124 (e.g., Bluetooth). Upon selecting to send the request 120, the app 110 on the user device 104 sends data indicating user activity (e.g., user clicks or selections) through the cloud 202, to the server 204, which the app(s) 208 interpret as making a selection to send the request 120 from the user device 104, to the user device 106. The app(s) 208 on the server 204 make the request 120 available to the app 116 on the user device 106 of the user or customer. For example, the app 116 (e.g., a web browser) on the user device 106 of the user or customer connects the user device 106 through cloud connectivity and the cloud 202, to the server 204, and to the app(s) 208, to observe the request 120 (e.g., a website access) and provide opportunity for the user to respond to the request 120. For example, the app(s) 208 on the server 204 generates a display with a selector (e.g., a soft button or a drop down menu item, on what to click) for acknowledging or accepting the request 120 and/or authorizing near-field connection 124 through enablement of near-field connectivity 126. Such generated display may be shown through a web browser, e.g., the app 116, on the user device 106. The user may acknowledge or accept the request and authorize near-field connection 124. Upon selecting to acknowledge and authorize near-field connection 124, the app 110 on the user device 104 sends data indicating user activity (e.g., user clicks or selections) through the cloud 202 and to counter the server 204, which the app(s) 208 interpret as receiving authorization 122 from the user device 106 of the user or customer, and making a selection to send the authorization 122 to the climate control system 102. The app(s) 208 on the server 204 then communicates the authorization 122 through the cloud 202, to the climate control system 102, where the processor 112 enables the near-field connectivity 126 and establishes the near-field connection 124 between the user device 104 of the technician and the climate control system 102. From then on, the technician can use the device 104 to communicate via the enabled near-field connectivity 126 and established near-field connection 124, with the climate control system 102, and perform service or diagnostics operations, etc.

Figure 3:
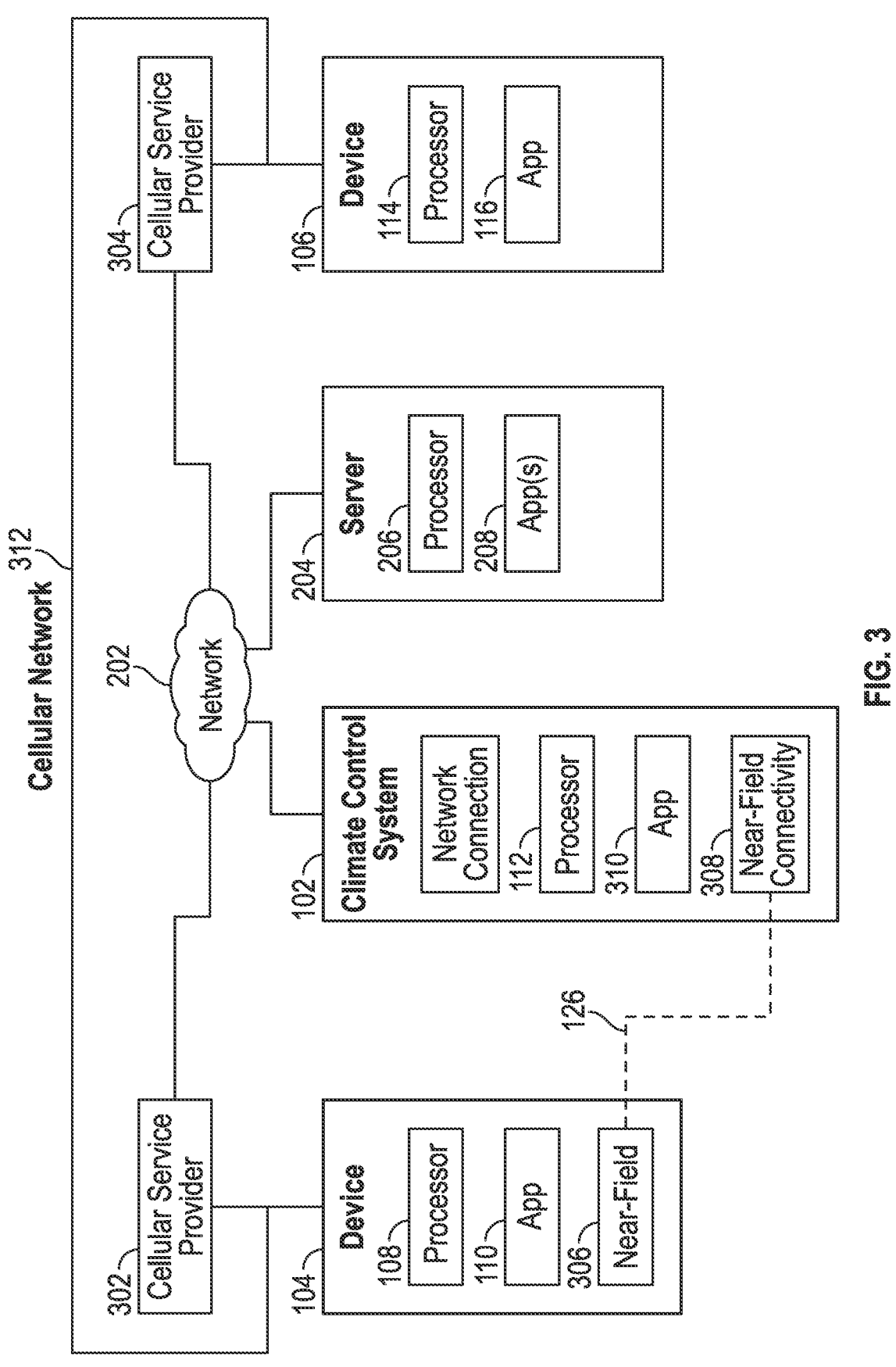
FIG. 3 illustrates embodiments of multiple systems with near-field connectivity, cloud connectivity, and cellular network connectivity, which may be seen as an extended system, in which a user device may connect with a climate control system, using near-field connectivity as authorized from another user device, through communication via a cellular network and through a cloud server.

FIG. 3 illustrates embodiments of multiple systems with near-field connectivity, cloud connectivity, and cellular network connectivity, which may be seen as an extended system, in which a user device 104 may connect with a climate control system 102, using near-field connectivity 126 as authorized from another user device 106, through communication via a cellular network and through a cloud server 204. Some aspects illustrated in FIG. 3 may be useful in embodiments described with reference to FIGS. 1 and 2, or variations thereof.

In embodiments depicted in FIG. 3, the user device 104 of the technician has, in addition to the processor 108 and on app 110, a near-field module 306. For example, as is common on smart phones (e.g., a type of user device or mobile device), the near-field module 306 could be a Bluetooth module, for Bluetooth connectivity and connection (e.g., when connectivity is enabled).

In turn, the climate control system 102 has a near-field connectivity module 308, which could be a Bluetooth module, for Bluetooth connectivity, or other near-field technology. And, the near-field connectivity module 308 acts as a gatekeeper, only enabling near-field connection when directed to do so, e.g., by an app 310 and the processor 112 in the climate control system. This functionality, and such components, could be embodied in a component of the climate control system 102, for example a smart thermostat for the climate control system 102. This or other "smart" component could include a display screen and buttons, touchscreen, or other user interface. The near-field module 306 of the user device 104 and the near-field connectivity module 308 of the climate control system 102 may communicate initially with each other through near-field connectivity 126, in an attempt to establish a near-field connection 124 (e.g., Bluetooth or other near-field technology broadcasting a beacon and/or searching for nearby devices with which to connect). But, near-field connection 124 (and associated communication and access) is to be established upon authorization, e.g., as described herein.

User devices 104, 106 may communicate with each other through the cellular network 312, for example mobile devices using voice communication or text messaging. In some embodiments, a request 120 for authorization of near-field connection 124 could be so communicated. Or, in some embodiments, a request 120 for authorization of near-field connection 124 could be communicated from the device 104 through a cellular network 312 (e.g., text message) to a cellular service provider 302 (e.g., a gateway or bridge server connecting cellular network and Internet), and then through the cloud 202 (e.g., Internet), to the server 204. Then, the request 120 could be communicated from the server 204, through the Internet 202, to a cellular service provider 304 (e.g., a gateway or bridge server connecting Internet and cellular network), and from there through the cellular network 312, to the user device 106. Authorization 122 could be communicated from the user device 106 through the cellular service provider 304 to the Internet 202 and the server 204, and from the server 204 through the Internet 202, to the climate control system 102.

Variations on the above-described embodiments, with various combinations of specialized or generalized apps in the various devices and systems, and with various communications paths and mechanisms for user interfaces and user interaction are readily developed in keeping with the teachings herein.

Figure 4:
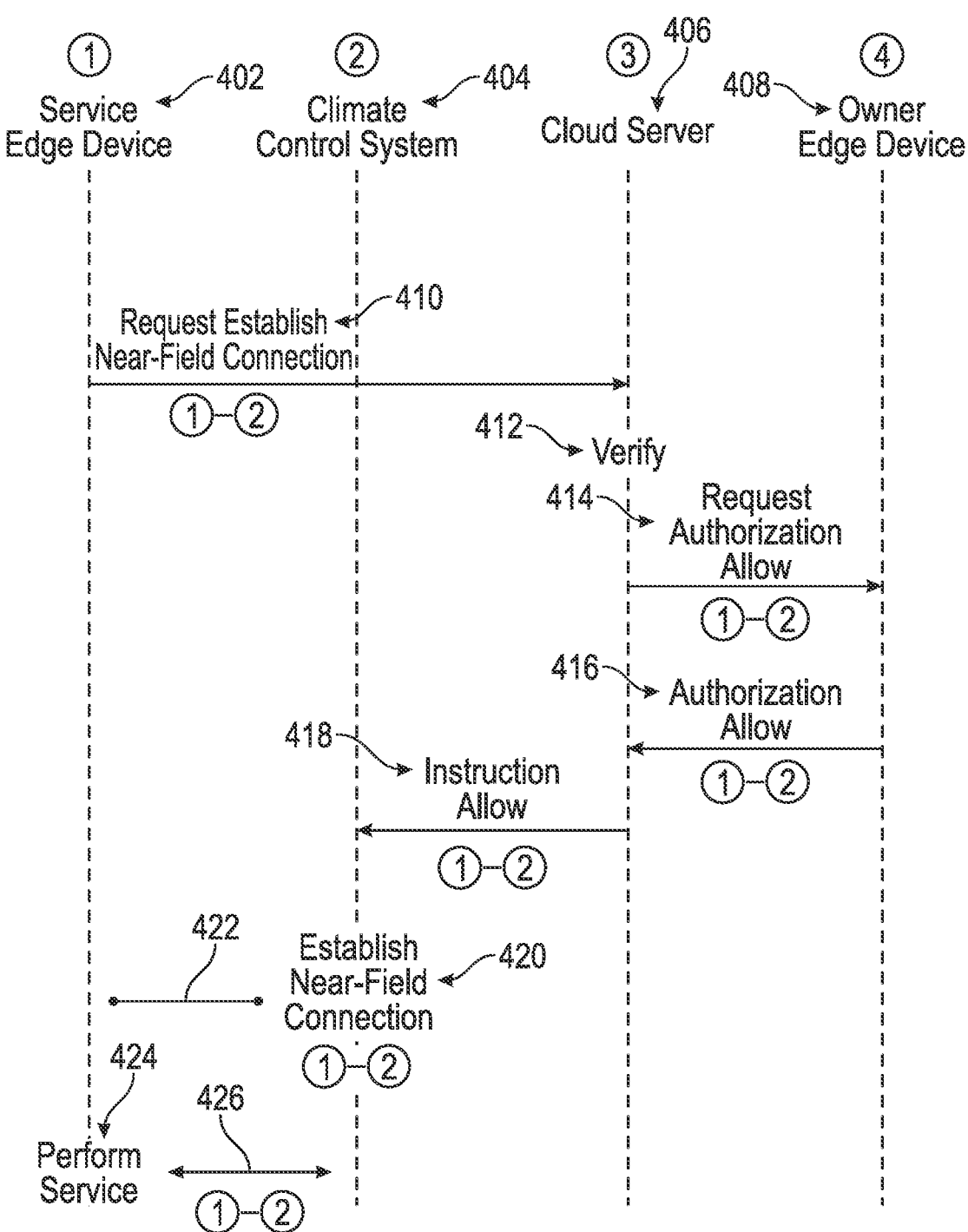
FIG. 4 is an action diagram, illustrating an embodiment of communications to request, authorize and establish a near-field connection between a service edge device and a climate control system, which may be practiced through embodiments described herein.

FIG. 4 is an action diagram, illustrating an embodiment of communications to request, authorize and establish a near-field connection between a service edge device and a climate control system, which may be practiced through embodiments described herein. At the top of FIG. 4 are the entities involved in the communications and actions, a service edge device 402 (e.g., a user device 104 operated by a technician) denoted by a circled 1, a climate control system 404 (e.g. one of the embodiments of climate control system 102 or variation thereof) denoted by a circled 2, cloud server 406 (e.g., server 204 connected to the Internet 202, or variation thereof) denoted by a circled 3, and owner edge device 408 (e.g., a user device 106 operated by a user or customer)

denoted by a circled 4. Communications and actions are read in a time sequence from the top of FIG. 4 to the bottom.

In one operating scenario, a request 410 to establish a near-field connection between entities circled 1 and circled 2, e.g., the service edge device 402 and the climate control system 404, is communicated from the service edge device 402, to the cloud server 406. The various apps, processors, communication paths, and equipment associated therewith may handle the request 410 in various ways in various embodiments.

The cloud server 406 performs a verify step 412, which may include various actions. For example, the cloud server 406 may verify the service edge device 402 is permitted to connect to the climate control system 404 via the near-field connection (e.g., near-field wireless connection). This may be based on various criteria (e.g., criterion parameters) which could include geographical proximity requirement, error indication requirement, existing service request, schedule requirement, technician or service provider ID, climate control system status, etc.

A request 414 for authorization to allow near-field connection between entities circled 1 and circled 2, e.g., the service edge device 402 and the climate control system 404, may be communicated from the cloud server 406 to the owner edge device 408.

An authorization 416 to allow near-field connection between entities circled 1 and circled 2, e.g., the service edge device 402 and the climate control system 404, may be communicated from the owner edge device 408, to the cloud server 406.

An instruction 418 to allow the near-field connection between entities circled 1 and circled 2, e.g., the service edge device 402 and the climate control system 404, may be communicated from the cloud server 406 to the climate control system 404.

The climate control system 404 may perform the action, establish 420 the near-field connection between entities circled 1 and circled 2, e.g., the service edge device 402 and the climate control system 404. This establishes the near-field connection 422, as authorized.

The service edge device 402 may perform the action, e.g., perform service 424, using communication 426 between entities circled 1 and circled 2, e.g., the service edge device 402 and the climate control system 404, after the authorized has been received and the near-field connection 422 has been established.

FIG. 5A is a flow diagram, illustrating an embodiment of a method of allowing a near-field wireless connection between a climate control system and a service edge device to be established for servicing the climate control system. The method may be practiced by a remote server, a cloud server, or other device having a processor. Further, in some examples, the method is practiced by a processor located a distance from the climate control system, for example. In those examples, the distance could be greater than the range of the near-field wireless connection. The service edge device may be a user device, for example operated by a technician and thus associated with a climate control system service provider, and such user device may have a processor and an app.

In an action 502, there may be a request from a service edge device to a remote server, to establish a near-field wireless connection between the service edge device and a climate control system.

In an action 504, the remote server may verify the service edge device for connection. For example, the remote server could verify the service edge device is permitted to connect to the climate control system via the near-field wireless connection. Verifying could be based on criteria, including geographic proximity requirement, error indication requirement, existing service request, or schedule requirement, etc. Verifying could be based on one or multiple authentication factors. Further verification criteria are readily devised in keeping with the teachings herein.

In an action 506, the remote server may send a request to the owner edge device, requesting authorization for near-field wireless connection between the service edge device and the climate control system. The owner edge device may be a user device such as a mobile device. The owner edge device may be configured to adjust a setting(s) of the climate control system, which may be unrelated to the near-field wireless connection. For example, the owner edge device may be able to control a temperature setpoint or a schedule, which may not be a setting adjustable via the near-field wireless connection. Or in other examples, the owner edge device may be able to adjust security setting, etc., again, which may not be a setting adjustable via the near-field wireless connection.

In some examples, action 506 may include the owner edge device displaying the indication that the request has been made, and may further include displaying one or more of the following: a name of the dealer, a name of the servicing company, a mobile number, a pin code, and a date. Further display criteria or information for display by the owner edge device are readily devised in keeping with the teachings herein.

In an action 508, the remote server may receive authorization from the owner edge device to allow the near-field wireless connection to be established.

In an action 510, the remote server may transmit instructions to the climate control system, to allow the near-field wireless connection to be established. This may include sending a signal to the service edge device to display an indication the near-field wireless connection is allowed. This may include enabling a near-field transceiver for an outdoor controller and maintaining a remainder of the near-field transceivers in an off state.

FIG. 5B is a flow diagram, illustrating an embodiment of a method of enabling a near-field wireless connection between a user device and a climate control system to be established for servicing the climate control system. The method may be practiced by various embodiments, such as practicing by a climate control system, practicing by a climate control system in cooperation with a cloud server, or variations thereof.

In an action 520, a request may be received to connect a first user device and a climate control system via near-field wireless connection. For example, the request could be received from the first user device, which could be a mobile phone or other user device operated by a technician, and could be received by the climate control system, or could be received by a cloud server or other remote device, in various embodiments.

In an action 522, a request for authorization to enable the near-field wireless connection to connect the first user device and the climate control system may be made to a second user device, which could be a mobile phone or other user device operated by a user, owner or customer. The request could be sent from the climate control system, or could be sent by a cloud server or other remote device, in various embodiments.

In an action 524, the climate control system may enable a near-field wireless connection of the first user device and the climate control system, based on the authorization from the second user device. There could be instruction sent from the second user device, or instructions sent from a cloud server or other remote device, in various embodiments. The climate control system could select between cooperating in near-field wireless connectivity and denying near-field wireless connection, based on whether such authorization from the second user device is obtained. In some examples, enabling the near-field wireless connection only includes enabling a transceiver associated with one controller in a system including multiple controllers. For example, this may include enabling a near-field transceiver for an outdoor controller and maintaining a remainder of the near-field transceivers in an off state.

Figures 5C, 6:
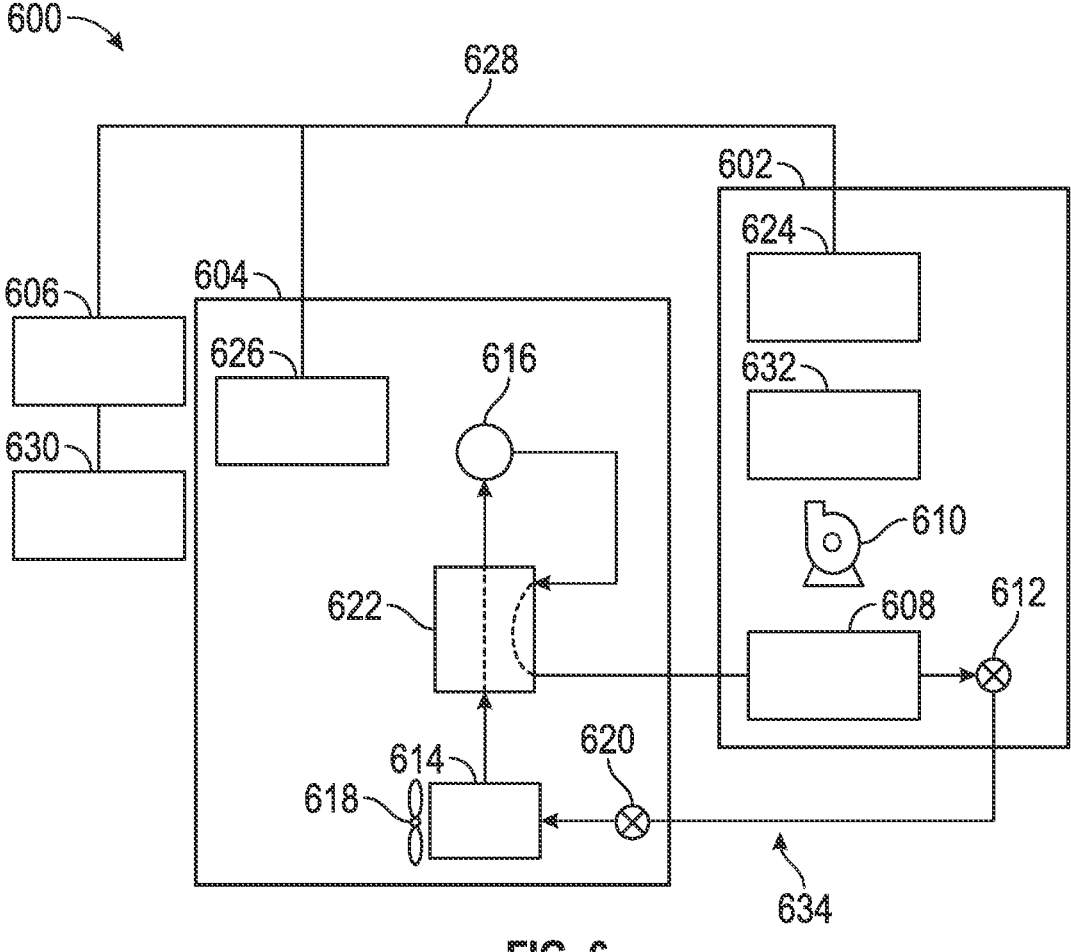
FIG. 5C is a flow diagram, illustrating an embodiment of a further method of enabling a near-field wireless connection between a user device and a climate control system to be established for servicing the climate control system.
FIG. 6 illustrates a schematic diagram of a climate control system, according to some example implementations of the present disclosure.

FIG. 5C is a flow diagram, illustrating an embodiment of a further method of enabling a near-field wireless connection between a user device and a climate control system to be established for servicing the climate control system. The method may be practiced by various embodiments, such as practicing by the climate control system, or practicing by the climate control system in cooperation with a cloud server or other remote device.

In an action 530, a request may be received from a first user device to establish a near-field wireless connection between the first user device and the climate control system. For example, the request could be received by the climate control system, or received by a cloud server or remote device. The first user device could be a user device operated by a technician.

In an action 532, authorization to establish a near-field wireless connection between the first user device and the climate control system may be requested to the second user device. For example, the second user device could be a user device operated by a user, owner or customer. The request for authorization could be made by or from the climate control system, or by or from a cloud server or remote device.

In an action 534, authorization may be received from the second user device. For example, the authorization could be received by a cloud server or remote device, and forwarded or instructions sent to the climate control system. Or, for example, the authorization could be received by the climate control system.

In an action 536, the climate control system may establish near-field wireless connection between the first user device and the climate control system. This is in accordance with the received authorization.

FIG. 6 shows a schematic diagram for at least an example climate control system 600, which may be the same or similar to climate control system 102 discussed above. Further, the following discussion of the example climate control system 600 is meant to provide a non-limiting example of the systems and components that may be used as part of the embodiments described herein.

In some examples, the climate control system 600 comprises a heat pump system that may be selectively operated to implement one or more substantially closed thermodynamic refrigerant cycles to provide a cooling functionality (hereinafter a "cooling mode") and/or a heating functionality (hereinafter a "heating mode"). The examples depicted in FIG. 6 are configured in a heating mode. The climate control system 600, in some examples is configured as a split system heat pump system, and generally comprises an indoor unit 602, an outdoor unit 604, and a system controller 606 that may generally control operation of the indoor unit 602 and/or the outdoor unit 604. The indoor unit 602 and the outdoor unit 604 may be fluidly coupled via the refrigerant fluid circuit 634.

Indoor unit 602 generally comprises an indoor air handling unit comprising an indoor heat exchanger 608, an indoor fan 610, an indoor metering device 612, and an indoor controller 624. The indoor heat exchanger 608 may generally be configured to promote heat exchange between a refrigerant fluid carried within internal tubing of the indoor heat exchanger 608 and an airflow that may contact the indoor heat exchanger 608 but that is segregated from the refrigerant fluid. Indoor unit 602 may at least partially include, or be coupled to, a duct system 632 including one or more of an air return duct, a supply duct, a register, a vent, a damper, an air filter, or the like for providing airflow.

The indoor metering device 612 may generally comprise an electronically-controlled motor-driven electronic expansion valve (EEV). In some examples, however, the indoor metering device 612 may comprise a thermostatic expansion valve, a capillary tube assembly, and/or any other suitable metering device.

Outdoor unit 604 generally comprises an outdoor heat exchanger 614, a compressor 616, an outdoor fan 618, an outdoor metering device 620, a switch over valve 622, and an outdoor controller 626. The compressor 616 may be any type of compressor, including a compressor the same or similar to compressors discussed above. The outdoor heat exchanger 614 may generally be configured to promote heat transfer between a refrigerant fluid carried within internal passages of the outdoor heat exchanger 614 and an airflow that contacts the outdoor heat exchanger 614 but is segregated from the refrigerant fluid.

The outdoor metering device 620 may generally comprise a thermostatic expansion valve. In some examples, however, the outdoor metering device 620 may comprise an electronically-controlled motor driven EEV similar to indoor metering device 612, a capillary tube assembly, and/or any other suitable metering device.

In some examples, the switch over valve 622 may generally comprise a four-way reversing valve. The switch over valve 622 may also comprise an electrical solenoid, relay, and/or other device configured to selectively move a component of the switch over valve 622 between operational positions to alter the flow path of refrigerant fluid through the switch over valve 622 and consequently the climate control system 600. Additionally, the switch over valve 622 may also be selectively controlled by the system controller 606, an outdoor controller 626, and/or the indoor controller 624.

The system controller 606 may generally be configured to selectively communicate with the indoor controller 624 of the indoor unit 602, the outdoor controller 626 of the outdoor unit 604, and/or other components of the climate control system 600. In some examples, the system controller 606 may be configured to control operation of the indoor unit 602, and/or the outdoor unit 604. In some examples, the system controller 606 may be configured to monitor and/or communicate with a plurality of temperature and pressure sensors associated with components of the indoor unit 602, the outdoor unit 604, and/or the outdoor ambient environment.

Additionally, in some examples, the system controller 606 may comprise a temperature sensor and/or may further be configured to control heating and/or cooling of conditioned spaces or zones associated with the climate control system 600. In some examples, the system controller 606 may be configured as a thermostat for controlling the supply of conditioned air to zones associated with the climate control system 600, and in some examples, the thermostat includes a temperature sensor.

The system controller 606 may also generally comprise an input/output (I/O) unit (e.g., a graphical user interface, a touchscreen interface, or the like) for displaying information and for receiving user inputs. The system controller 606 may display information related to the operation of the climate control system 600 and may receive user inputs related to operation of the climate control system 600. However, the system controller 606 may further be operable to display information and receive user inputs tangentially related and/or unrelated to operation of the climate control system 600. In some examples, the system controller 606 may not comprise a display and may derive all information from inputs that come from remote sensors and remote configuration tools.

In some examples, the system controller 606 may be configured for selective bidirectional communication over a communication bus 628, which may utilize any type of communication network. For example, the communication may be via wired or wireless data links directly or across one or more networks, such as a control network. Examples of suitable communication protocols for the control network include CAN, TCP/IP, BACnet, LonTalk, Modbus, ZigBee, Zwave, Wi-Fi, SIMPLE, Bluetooth, and the like. For example, the system controller 606 includes a transceiver that enables a near-field wireless connection, e.g., Bluetooth, with an external device.

The indoor controller 624 may be carried by the indoor unit 602 and may generally be configured to receive information inputs, transmit information outputs, and/or otherwise communicate with the system controller 606, the outdoor controller 626, and/or any other device 630 via the communication bus 628 and/or any other suitable medium of communication. In some examples, the device 630 may include some or all devices discussed herein, e.g., user device 104, user device 106, and/or server 204. For example, indoor controller 624 may include a transceiver that enables a near-field wireless connection, e.g., Bluetooth, with an external device.

The outdoor controller 626 may be carried by the outdoor unit 604 and may be configured to receive information inputs from the system controller 606, which may be a thermostat. In some examples, the outdoor controller 626 may be configured to receive information related to an ambient temperature associated with the outdoor unit 604, information related to a temperature of the outdoor heat exchanger 614, and/or information related to refrigerant temperatures and/or pressures of refrigerant entering, exiting, and/or within the outdoor heat exchanger 614 and/or the compressor 616.

The outdoor controller 626 may be carried by the outdoor unit 604 and may generally be configured to receive information inputs, transmit information outputs, and/or otherwise communicate with the system controller 606, the indoor controller 624, and/or any other device 630 via the communication bus 628 and/or any other suitable medium of communication. In some examples, the device 630 may include some or all devices discussed herein, e.g., user device 104, user device 106, and/or server 204. For example, outdoor controller 626 may include a transceiver that enables a near-field wireless connection, e.g., Bluetooth, with an external device. Therefore, where a near-field connection 124 is established between the user device 104 and the outdoor controller 626, the user device 104 may be capable of an indirect or operable connection with the system controller 606, and therefore receive signals indicative of the status and/or operation of the climate control system 102 as if the user device 104 were connected to any controller of the system.

Figure 7:
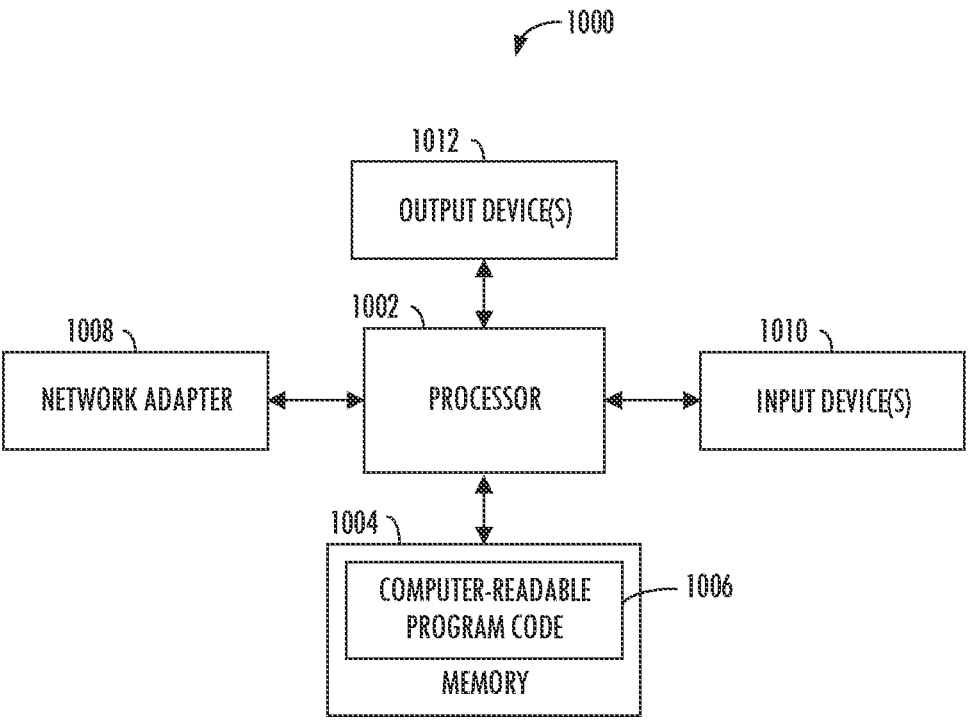
FIG. 7 illustrates control circuitry, according to some example implementations of the present disclosure.

FIG. 7 illustrates the control circuitry 1000, which may be an apparatus, according to some examples of the present disclosure. In some examples, the control circuitry 1000 includes some or all of the climate control system 102, and/or the indoor controller 624 device(s) 104, 106, or any other similar apparatus as described by the present disclosure. In some examples multiple components include control circuitry. For example, the climate control system 102 may comprise control circuitry 1000, the user device(s) 104, 106 may comprise separate control circuitry 1000, and the server 204 may also include its own control circuitry. Indeed, in some examples, the control circuitry 1000 may include one or more of each of a number of components such as, for example, a processor 1002 connected to a memory 1004. The processor is generally any piece of computer hardware capable of processing information such as, for example, data, computer programs and/or other suitable electronic information. The processor includes one or more electronic circuits some of which may be packaged as an integrated circuit or multiple interconnected integrated circuits (an integrated circuit at times more commonly referred to as a "chip"). The processor 1002 may be a number of processors, a multi-core processor or some other type of processor, depending on the particular example.

The processor 1002 may be configured to execute computer programs such as computer-readable program code 1006, which may be stored onboard the processor or otherwise stored in the memory 1004. In some examples, the processor may be embodied as, or otherwise include, one or more ASICs, FPGAs or the like. Thus, although the processor may be capable of executing a computer program to perform one or more functions, the processor of various examples may be capable of performing one or more functions without the aid of a computer program.

The memory 1004 is generally any piece of computer hardware capable of storing information such as, for example, data, computer-readable program code 1006 or other computer programs, and/or other suitable information either on a temporary basis and/or a permanent basis. The memory may include volatile memory such as random access memory (RAM), and/or non-volatile memory such as a hard drive, flash memory or the like. In various instances, the memory may be referred to as a computer-readable storage medium, which is a non-transitory device capable of storing information. In some examples, then, the computer-readable storage medium is non-transitory and has computer-readable program code stored therein that, in response to execution by the processor 1002, causes the control circuitry 1000 to perform various operations as described herein, some of which may in turn cause the climate control system to perform various operations.

In addition to the memory 1004, the processor 1002 may also be connected to one or more peripherals such as a network adapter 1008, e.g., for interfacing with a communication bus as described above, one or more input/output (I/O) devices (e.g., input device(s) 1010, output device(s) 1012) or the like. The network adapter is a hardware component configured to connect the control circuitry 1000 to a computer network to enable the control circuitry to transmit and/or receive information via the computer network. The I/O devices may include one or more input devices capable of receiving data or instructions for the control circuitry, and/or one or more output devices capable of providing an output from the control circuitry. Examples of suitable input devices include a keyboard, keypad or the like, and examples of suitable output devices include a display device such as a one or more light-emitting diodes (LEDs), a LED display, a liquid crystal display (LCD), or the like.

The following clauses are statements of embodiments as may be applicable in various combinations.

Clause 1. A method of allowing a near-field wireless connection between a climate control system and a service edge device to be established for servicing the climate control system, the method comprising:

receiving a request to establish the near-field wireless connection between the climate control system and the service edge device, the request sent from the service edge device to a processor associated with the climate control system, the processor located a distance from the climate control system;

verifying the service edge device is permitted to connect to the climate control system via the near-field wireless connection;

requesting authorization to allow the near-field wireless connection to be established based on the request, the requested authorization sent to an owner edge device, the owner edge device configured to adjust at least one setting of the climate control system unrelated to the near-field wireless connection;

receiving the authorization from the owner edge device to allow the near-field wireless connection to be established; and transmitting instructions to allow the near-field wireless connection to be established, wherein allowing the near-field wireless connection to be established includes sending a signal to the service edge device to display an indication the near-field wireless connection is allowed.

Clause 2. The method of Clause 1, wherein the service edge device is associated with a climate control service provider, and the method further comprises:

establishing the near-field wireless connection between the climate control system and service edge device; and transmitting technical information regarding the climate control system to the service edge device via the near-field wireless connection.

Clause 3. The method of Clause 2, further comprising:

determining a fault condition associated with the climate control system exists based on the technical information; and transmitting a software correction to the climate control system from the service edge device via the near-field wireless connection, the software correction directed to the fault condition.

Clause 4. The method of Clause 1, wherein the service edge device, the processor, and the owner edge device are each connected to a network, wherein receiving the request further includes receiving the request via the network, wherein requesting authorization further includes sending the requested authorization to the device via the network, and wherein receiving the authorization from the owner edge device further includes transmitting the authorization from the owner edge device via the network.

Clause 5. The method of Clause 1, wherein the processor is associated with a remote server, the remote server located a distance from the climate control system and the owner edge device, the distance being greater than a range of the near-field wireless connection.

Clause 6. The method of Clause 1, wherein the service edge device, the processor, and the owner edge device are each located a distance from each other, the distance being greater than a range of the near-field wireless connection.

Clause 7. The method of Clause 1, wherein verifying the service edge device is permitted to connect to the climate control system is based on at least one of a plurality of criterion, the plurality of criterion including the following: geographical proximity requirement, an error indication requirement, an existing service request, and a schedule requirement.

Clause 8. The method of Clause 1, wherein requesting authorization further includes displaying an indication that the request has been made on the owner edge device, and providing a user an option to allow or deny the request; and wherein receiving the authorization further includes receiving a user input allowing the request.

Clause 9. The method of Clause 8, wherein the owner edge device is located a distance from the climate control system and the processor, and wherein receiving the authorization further includes receiving the user input allowing the request via a network connection.

Clause 10. The method of Clause 8, wherein displaying the indication that the request has been made further includes displaying one or more of the following: a name of a dealer, a name of a servicing company, a pin code, and a date.

Clause 11. The method of Clause 1, wherein the climate control system includes a system controller and an outdoor controller, wherein the near-field wireless connection is between the outdoor controller and the service edge device, wherein transmitting instructions to allow the near-field wireless connection to be established includes transmitting an indication that authorization has been received from the system controller to the outdoor controller, and wherein the near-field wireless connection permits data transfer between the service edge device and the system controller.

Clause 12. The method of Clause 11, wherein the climate control system further includes an indoor controller associated with an indoor climate control unit, and wherein the near-field wireless connection permits the service edge device to receive data indicative of operation of the indoor climate control unit.

Clause 13. The method of Clause 1, wherein the climate control system includes a plurality of near-field transceivers, and wherein transmitting instructions to allow the near-field wireless connection includes enabling a near-field transceiver for an outdoor controller and maintaining a remainder of the plurality of near-field transceivers in an off state.

Clause 14. The method of Clause 1, wherein allowing the near-field wireless connection to be established further includes allowing the near-field wireless connection to be established for a limited period of time.

Clause 15. The method of Clause 14, wherein the limited period of time is based on an identified service issue.

Clause 16. The method of Clause 1, further comprising: establishing the near-field wireless connection between the service edge device and the climate control system, wherein establishing the near-field wireless connection includes permitting a limiting a set of commands via the near-field wireless connection.

Clause 17. A system configured to allow a near-field wireless connection between a climate control system and a service edge device to be established for servicing the climate control system, the system comprising:

the climate control system including at least one transceiver configured to send and receive signals via the near-field connection;

an owner edge device associated with the climate control system and configured to adjust at least one setting of the climate control system unrelated to the near-field wireless connection;

a remote server associated with the climate control system, the remote server configured to:

receive a request to establish the near-field wireless connection between the climate control system and the service edge device, the request sent from the service edge device to a processor associated with the remote server;

verify the service edge device is permitted to connect to the climate control system via the near-field wireless connection;

request authorization to allow the near-field wireless connection to be established based on the request, the requested authorization sent to the owner edge device;

receive the authorization from the owner edge device to allow the near-field wireless connection to be established; and transmit instructions to allow the near-field wireless connection to be established, wherein allowing the near-field wireless connection to be established includes sending a signal to the service edge device to display an indication the near-field wireless connection is allowed.

Clause 18. The system of Clause 17, wherein the service edge device is associated with a climate control service provider, and wherein the transceiver is further configured to transmit technical information regarding the climate control system to the service edge device via the near-field wireless connection in response to the near-field wireless connection being established between the climate control system and service edge device.

Clause 19. The system of Clause 18, wherein the service edge device is further configured to:

determine a fault condition associated with the climate control system exists based on the technical information; and transmit a software correction to the climate control system via the near-field wireless connection, the software correction directed to the fault condition.

Clause 20. The system of Clause 17, wherein the service edge device, the remote server, and the owner edge device are each connected to a network, wherein receiving the request further includes receiving the request via the network, wherein requesting authorization further includes sending the requested authorization to the owner edge device via the network, and wherein receiving the authorization from the owner edge device further includes transmitting the authorization from the owner edge device via the network.

Clause 21. The system of Clause 17, wherein the remote server located a distance from the climate control system and the owner edge device, the distance being greater than a range of the near-field wireless connection.

Clause 22. The system of Clause 17, wherein the service edge device, the remote server, and the owner edge device are each located a distance from each other, the distance being greater than a range of the near-field wireless connection.

Clause 23. The system of Clause 17, wherein verifying the service edge device is permitted to connect to the climate control system is based on at least one of a plurality of criterion, the plurality of criterion including the following: geographical proximity requirement, an error indication requirement, an existing service request, and a schedule requirement.

Clause 24. The system of Clause 17, wherein the remote server configured to request authorization is further configured to send a signal to display an indication that the request has been made to the owner edge device, and provide a user an option to allow or deny the request; and wherein the remote server configured to receive the authorization is further configured to receive a user input allowing the request.

Clause 25. The system of Clause 17, wherein the owner edge device is located a distance from the climate control system and the remote server, and wherein the remote server configured to receive the authorization is further configured to receive the user input allowing the request via a network connection.

Clause 26. The system of Clause 17, wherein the remote server configured to send the signal to display the indication that the request has been made is further configured to send a signal to display one or more of the following: a name of a dealer, a name of a servicing company, a pin code, and a date.

Clause 27. The system of Clause 17, wherein the climate control system includes a system controller and an outdoor controller, wherein the at least one transceiver is located within the outdoor controller, and wherein the remote server configured to transmit instructions to allow the near-field wireless connection to be established is further configured to transmit an indication that authorization has been received to the system controller, wherein the system controller is configured to transmit the indication that authorization has been received to the outdoor controller, wherein the outdoor controller is configured to enable the at least one transceiver in response to receiving the indication that authorization has been received, wherein enabling the at least one transceiver, in part, allows the near-field wireless connection to be established, and wherein, once established, the near-field wireless connection permits data transfer between the service edge device and the system controller.

Clause 28. The system of Clause 27, wherein the climate control system further includes an indoor controller associated with an indoor climate control unit, and wherein, once established, the near-field wireless connection further permits the service edge device to receive data indicative of operation of the indoor climate control unit.

Clause 29. The system of Clause 17, wherein the at least one near-field transceiver includes a plurality of near-field transceivers, and wherein remote server configured to transmit instructions to allow the near-field wireless connection is further configured to enable a near-field transceiver for an outdoor controller and maintaining a remainder of the plurality of near-field transceivers in an off state.

Clause 30. The system of Clause 17, wherein the remote server configured to transmit instructions to allow the near-field wireless connection is further configured to transmit instructions to allow the near-field wireless connection to be established for a limited period of time.

Clause 31. The system of Clause 30, wherein the limited period of time is based on an identified service issue.

Clause 32. The system of Clause 17, wherein the near-field wireless connection includes permitting a limiting a set of commands via the near-field wireless connection in response to establishing the near-field wireless connection between the service edge device and the climate control system.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of allowing a near-field wireless connection between a climate control system and a service edge device to be established for servicing the climate control system, the method comprising:

receiving a request to establish the near-field wireless connection between the climate control system and the service edge device, the request sent from the service edge device to a processor associated with the climate control system, the processor located a distance from the climate control system;

verifying the service edge device is permitted to connect to the climate control system via the near-field wireless connection;

requesting authorization to allow the near-field wireless connection to be established based on the request, the requested authorization sent to an owner edge device, the owner edge device configured to adjust at least one setting of the climate control system unrelated to the near-field wireless connection;

receiving the authorization from the owner edge device to allow the near-field wireless connection to be established; and transmitting instructions to allow the near-field wireless connection to be established, wherein allowing the near-field wireless connection to be established includes sending a signal to the service edge device to display an indication the near-field wireless connection is allowed.

2. The method of claim 1, wherein the service edge device is associated with a climate control service provider, and the method further comprises:

establishing the near-field wireless connection between the climate control system and service edge device; and transmitting technical information regarding the climate control system to the service edge device via the near-field wireless connection.

3. The method of claim 2, further comprising:

determining a fault condition associated with the climate control system exists based on the technical information; and transmitting a software correction to the climate control system from the service edge device via the near-field wireless connection, the software correction directed to the fault condition.

4. The method of claim 1, wherein the processor is associated with a remote server, the remote server located a distance from the climate control system and the owner edge device, the distance being greater than a range of the near-field wireless connection.

5. The method of claim 1, wherein the service edge device, the processor, and the owner edge device are each located a distance from each other, the distance being greater than a range of the near-field wireless connection.

6. The method of claim 1, wherein requesting authorization further includes displaying an indication that the request has been made on the owner edge device, and providing a user an option to allow or deny the request; and wherein receiving the authorization further includes receiving a user input allowing the request.

7. The method of claim 6, wherein displaying the indication that the request has been made further includes displaying one or more of the following: a name of a dealer, a name of a servicing company, a pin code, and a date.

8. The method of claim 1, wherein the climate control system includes a system controller and an outdoor controller, wherein the near-field wireless connection is between the outdoor controller and the service edge device, wherein transmitting instructions to allow the near-field wireless connection to be established includes transmitting an indication that authorization has been received from the system controller to the outdoor controller, and wherein the near-field wireless connection permits data transfer between the service edge device and the system controller.

9. The method of claim 8, wherein the climate control system further includes an indoor controller associated with an indoor climate control unit, and wherein the near-field wireless connection permits the service edge device to receive data indicative of operation of the indoor climate control unit.

10. The method of claim 1, wherein the climate control system includes a plurality of near-field transceivers, and wherein transmitting instructions to allow the near-field wireless connection includes enabling a near-field transceiver for an outdoor controller and maintaining a remainder of the plurality of near-field transceivers in an off state.

11. The method of claim 1, further comprising:

establishing the near-field wireless connection between the service edge device and the climate control system, wherein establishing the near-field wireless connection includes permitting a limiting a set of commands via the near-field wireless connection.

12. The system of claim 11, wherein the remote server located a distance from the climate control system and the owner edge device, the distance being greater than a range of the near-field wireless connection.

13. The system of claim 11, wherein the service edge device, the remote server, and the owner edge device are each located a distance from each other, the distance being greater than a range of the near-field wireless connection.

14. The system of claim 11, wherein the remote server configured to request authorization is further configured to send a signal to display an indication that the request has been made to the owner edge device, and provide a user an option to allow or deny the request; and wherein the remote server configured to receive the authorization is further configured to receive a user input allowing the request.

15. The system of claim 11, wherein the climate control system includes a system controller and an outdoor controller, wherein the at least one transceiver is located within the outdoor controller, and wherein the remote server configured to transmit instructions to allow the near-field wireless connection to be established is further configured to transmit an indication that authorization has been received to the system controller, wherein the system controller is configured to transmit the indication that authorization has been received to the outdoor controller, wherein the outdoor controller is configured to enable the at least one transceiver in response to receiving the indication that authorization has been received, wherein enabling the at least one transceiver, in part, allows the near-field wireless connection to be established, and wherein, once established, the near-field wireless connection permits data transfer between the service edge device and the system controller.

16. The system of claim 15, wherein the climate control system further includes an indoor controller associated with an indoor climate control unit, and wherein, once established, the near-field wireless connection further permits the service edge device to receive data indicative of operation of the indoor climate control unit.

17. The system of claim 1, wherein the at least one near-field transceiver includes a plurality of near-field transceivers, and wherein remote server configured to transmit instructions to allow the near-field wireless connection is further configured to enable a near-field transceiver for an outdoor controller and maintaining a remainder of the plurality of near-field transceivers in an off state.

18. A system configured to allow a near-field wireless connection between a climate control system and a service edge device to be established for servicing the climate control system, the system comprising:

the climate control system including at least one transceiver configured to send and receive signals via the near-field connection;

an owner edge device associated with the climate control system and configured to adjust at least one setting of the climate control system unrelated to the near-field wireless connection;

a remote server associated with the climate control system, the remote server configured to:

receive a request to establish the near-field wireless connection between the climate control system and the service edge device, the request sent from the service edge device to a processor associated with the remote server;

verify the service edge device is permitted to connect to the climate control system via the near-field wireless connection;

request authorization to allow the near-field wireless connection to be established based on the request, the requested authorization sent to the owner edge device;

receive the authorization from the owner edge device to allow the near-field wireless connection to be established; and transmit instructions to allow the near-field wireless connection to be established, wherein allowing the near-field wireless connection to be established includes sending a signal to the service edge device to display an indication the near-field wireless connection is allowed.

19. The system of claim 18, wherein the service edge device is associated with a climate control service provider, and wherein the transceiver is further configured to transmit technical information regarding the climate control system to the service edge device via the near-field wireless connection in response to the near-field wireless connection being established between the climate control system and service edge device.

20. The system of claim 19, wherein the service edge device is further configured to:

determine a fault condition associated with the climate control system exists based on the technical information; and transmit a software correction to the climate control system via the near-field wireless connection, the software correction directed to the fault condition.

\* \* \* \* \*